March 17. 1925.
I. H. FREESE
1,529,947
METHOD OF MAKING VARIEGATED GLASS
Filed April 15, 1922     3 Sheets-Sheet 2
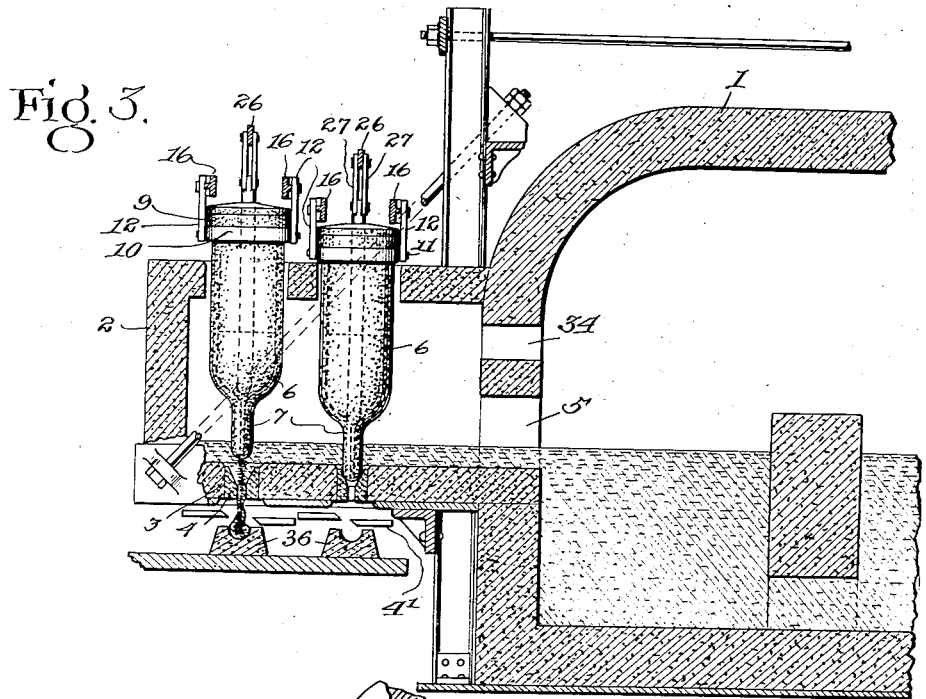
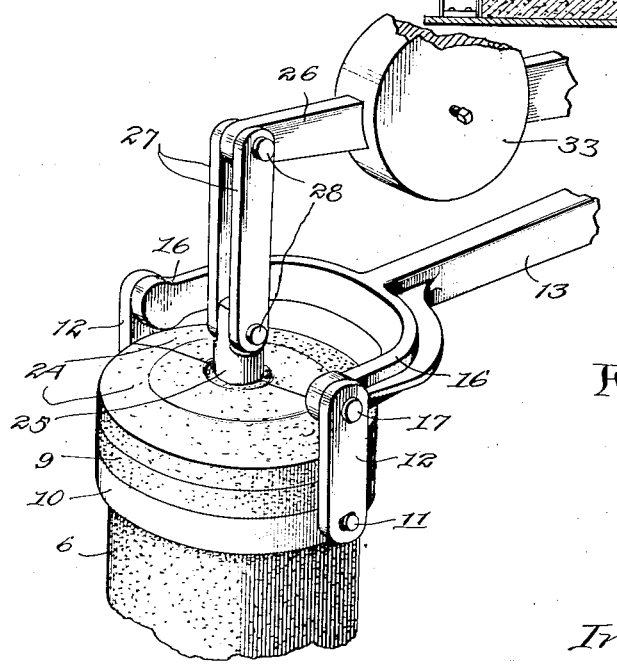
Inventor
Ira H. Freese
Eccleston & Eccleston
Attorneys

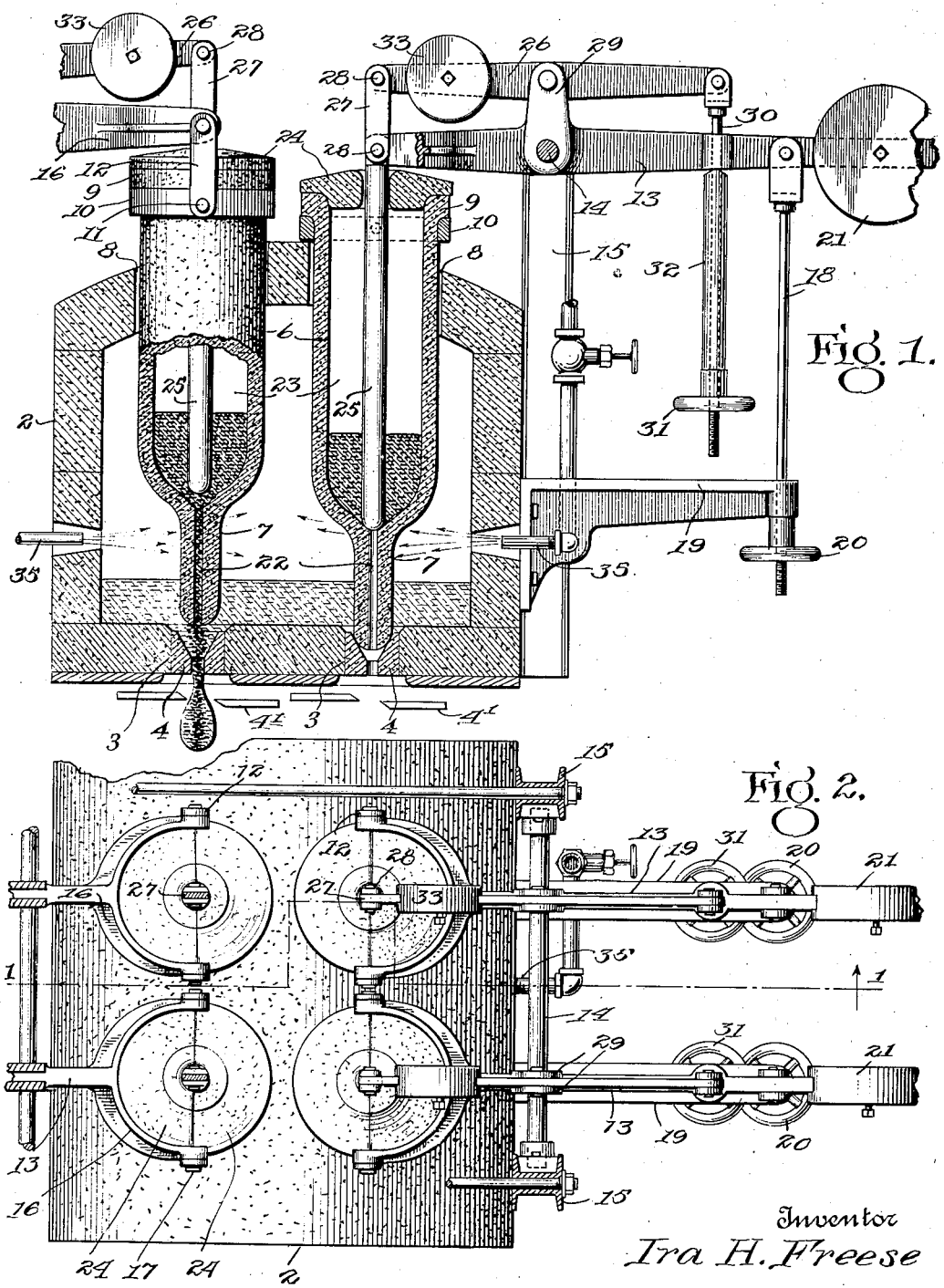

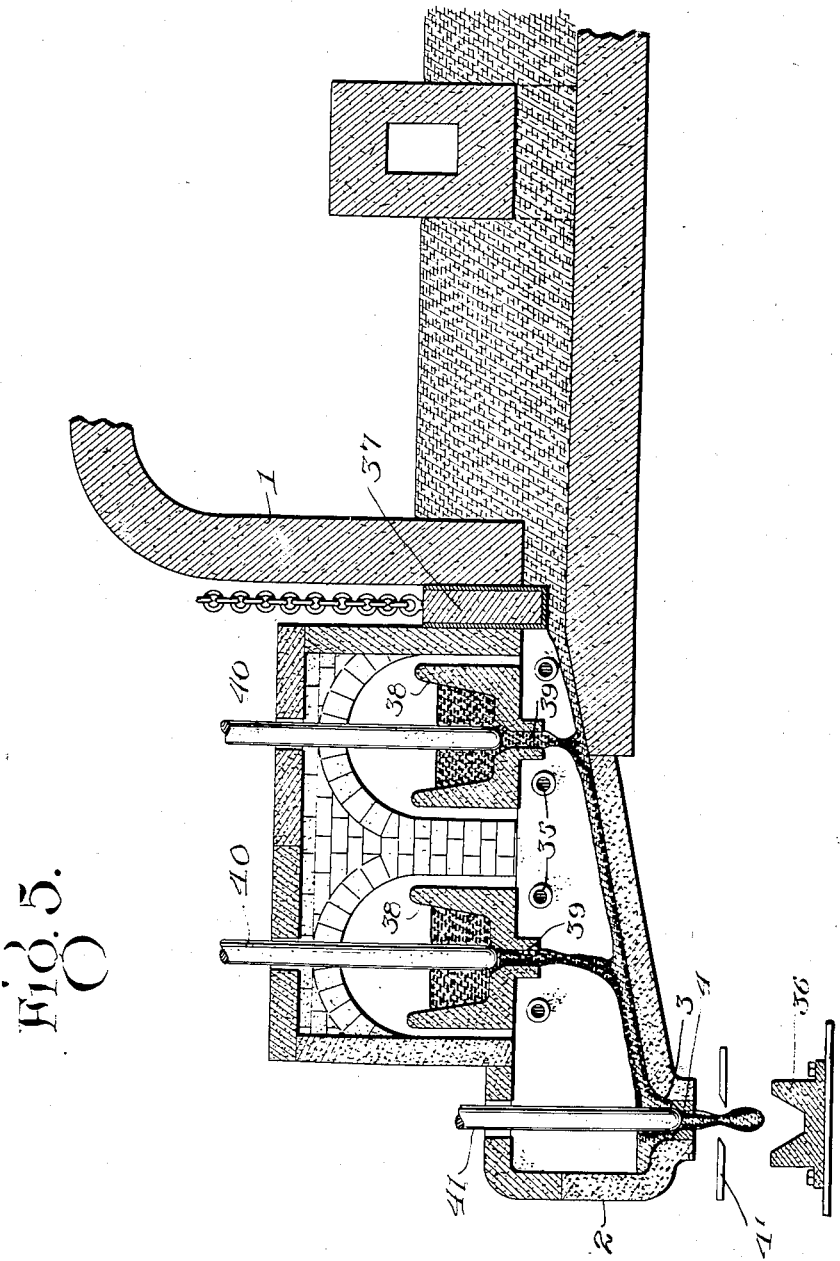

Patented Mar. 17, 1925.

1,529,947

UNITED STATES PATENT OFFICE.

IRA H. FREESE, OF CLARKSBURG, WEST VIRGINIA.

METHOD OF MAKING VARIEGATED GLASS.

Application filed April 15, 1922. Serial No. 553,145.

*To all whom it may concern:*

Be it known that I, IRA H. FREESE, a citizen of the United States, residing at Clarksburg, in the county of Harrison and State of West Virginia, have invented a new and useful Method of Making Variegated Glass, of which the following is a full, clear, and exact description.

My invention relates to what is believed to be an entirely new method for making variegated glass, and one of the advantages of my invention is that such glass may be produced while it is flowing in a stream from the furnace or flow spout. The apparatus disclosed herein forms the subject-matter of a divisional application #622,864, filed March 5, 1923.

The invention relates more particularly to the manufacture of variegated glass marbles, though, of course, it is not limited thereto; and by the method to be described herein glass or other coloring substance of any desired color may be injected into the center of the flowing glass stream, thereby greatly reducing the cost of manufacture of marbles or similar articles, and producing many other advantageous results, which need not be mentioned herein, as they will be obvious to those skilled in the art.

I will now describe the method and two particular forms of apparatus by which the method may be carried out, it being understood that those skilled in the art may make many changes and modifications therein without departing from the spirit of my invention as defined in the appended claims; and the drawings forming part of this specification are, therefore, to be considered merely as illustrative and not in any limiting sense.

In the drawings:

Figure 1 is a vertical sectional view through the flow spout taken on line 1—1 of Figure 2; parts being broken away to more clearly show the construction.

Figure 2 is a plan view of the flow spout, containers, and operating mechanism; parts being in section.

Figure 3 is a longitudinal vertical sectional view through the furnace and flow spout; the containers being shown in elevation.

Figure 4 is a fragmentary perspective view of one of the containers and the operating mechanism, and Figure 5 is a vertical longitudinal sectional view of a modified form of the apparatus.

Referring to the drawings more in detail, numeral 1 indicates generally a conventional glass melting tank, having the usual flow spout 2, which is provided with one or more flow holes 3, in which are arranged removable bushings 4 of refractory material. Molten glass flows through the throat 5 into the flow spout 2, maintaining a certain level therein, and flowing out through the flow holes to molds or other forming devices. Conventional shears 4' are positioned below the flow holes, and are adapted to be operated at predetermined intervals to sever the glass stream in the well known manner. The structure thus far described is old and well known in the art, and further description thereof is believed to be unnecessary.

In the drawings I have shown the flow spout as provided with four flow holes, and appropriate mechanism associated with each of the flow holes; but, of course, it is not my intention to be limited to any particular number of flow holes, and I may use either a greater or lesser number than the number shown; and, as the mechanism associated with the four flow holes is identical, a description of one will be sufficient.

I will first describe the means which I have provided for controlling the flow of molten glass from the flow spout, through the flow holes, to the molds or other forming devices.

A container valve, indicated generally by numeral 6, is mounted in the flow spout in alignment with the flow hole, and has a valve stem 7 projecting downwardly from the lower portion thereof, the lower end of the stem being rounded or otherwise formed to seat against the bushing 4 and close the flow hole or orifice 3 when the container valve is lowered.

The container valve extends through a suitable opening 8 provided in the top of the flow spout, and is flanged adjacent its upper end, as indicated by numeral 9. The container valve is carried by a ring 10 adapted to abut against the flange 9; the ring being provided with diametrically opposed projections 11 to which the lower ends of the links 12 are attached.

A lever 13 is fulcrumed on a shaft 14, the shaft being supported in any desired manner, in the present instance it being shown as mounted in the stays 15. The lever 13 is forked adjacent the container, and the tines 16, 16 are provided with projections 17 adapted to receive the upper ends of connecting links 12.

A rod 18 is pivotally attached to the lever 13, and extends downwardly through an opening provided in the bracket 19. The rod 18 is screw threaded adjacent its lower end, and mounted thereon abutting the lower face of the bracket is a hand wheel 20 or other suitable operating means. The lever 13 is preferably provided with a counterbalance weight 21.

The means for operating the container valve will be clearly understood from the foregoing description. It is only necessary to rotate the hand wheel 20 in the proper direction to lift the container valve, thereby unseating the valve 7 and permitting the molten glass to flow through the flow holes to the molds or other forming devices. By rotating the hand wheel in the opposite direction the container valve is lowered and the valve is seated, thereby shutting off the flow of molten glass.

While I have described a specific means for operating the container valve, it is to be clearly understood that the invention is in no way limited to such means, and I may substitute such other operating means that I may in the future prefer.

Thus far I have described only the apparatus for controlling the flow of molten glass from the flow spout to the molds. I will now describe the means by which molten glass or other substance of a different color or composition is injected into the flowing stream.

The valve 6 has been termed a "container valve," for the reason that it has the dual function of being a container or receptacle for the molten glass of different color, and also being a valve to control the flow of glass through the flow hole.

The container valve is preferably made of some refractory material, and as shown in the drawings it is circular in cross-section, though obviously it may have any desired cross-sectional shape. The lower portion of the container valve, constituting the valve stem, has a passage 22 extending therethrough, the passage communicating with the interior of the enlarged portion of the container valve, which is the container proper, and is indicated by the numeral 23.

The container is open at the top to permit charges to be supplied thereto as required. If desired, a cover may be employed, and in the drawings I have indicated a cover in use, the particular cover shown being in two parts and referred to by numeral 24.

For the purpose of controlling the flow of the molten glass from the container through the passage 22, I have provided a vertically adjustable valve plug 25. This valve plug is pivotally attached to a lever 26 by any desired means, such as by links 27 and pins 28.

The lever 26 is shown as fulcrumed between projections 29, which are preferably cast integral with lever 13. A rod 30 is pivotally attached to the lever 26 and extends downwardly through a passage in the lever 13; the lower portion of the rod being screw threaded and having a hand wheel 31, or other suitable operating means, mounted thereon. A spacing collar 32 is mounted on the rod 30, and extends from the hand wheel 31 to the lever 13, the upper end of the collar being beveled to permit relative movement between the collar and the lever 13. The lever 26 is preferably provided with a counterbalance weight 33.

The means for operating the valve plug 25 will be clearly understood from the foregoing description. By rotating the hand wheel 31, or other operating means, in one direction, the plug will be lifted, thereby unseating the valve and permitting the molten glass in the container to flow therefrom through the passage 22. While by rotating the hand wheel in the opposite direction the plug will be lowered, seating the valve, and shutting off the flow of glass from the container. Of course, I may substitute any other desirable means for controlling the passage 22, and the invention is in no way limited to the particular valve and operating means shown and described.

However, it is to be noted in connection with the specific operating means disclosed herein that the levers 13 and 26 are so related that if the lever 13 and the container valve carried thereby are raised or lowered a certain distance, then the lever 26 and the valve plug carried thereby will be raised or lowered a like distance. So that if the parts are in the position as shown in the right hand container valve of Figure 1, and the hand wheel 20 is rotated to lift the container valve, then the glass in the flow spout will be free to flow out through the flow hole; but the valve plug 25 will remain seated until it is lifted by the operation of the hand wheel 31. On the other hand, the container valve may be maintained seated, and by the operation of the hand wheel 31 alone the valve plug 25 may be lifted to permit the colored glass to flow from the container through the passage 22. And, of course, by unseating both valves, the glass from the flow spout, and the glass from the container, will simultaneously flow from the flow hole, the colored glass from the container being injected into the center of the column of glass flowing from the flow spout. It is thus obvious that by this simple mechanism I am not only able to inject a stream of glass of one color into the center of a flowing stream of glass of another color; but also by the proper manipulation of the mechanism I am able to obtain a stream of glass consisting solely of glass of either color.

The furnace is provided with an opening 34, whereby heat is supplied from the furnace to the flow spout and containers to maintain the glass in a molten condition, and ordinarily the radiant heat surrounding the containers will be sufficient for that purpose, but in case additional heat should be required for the containers, it may be supplied from external sources, such as by burners 35.

In actual practice I may employ one container or a plurality thereof; and it will be understood that when more than one container is used, each of them may have a charge of glass of different color, so that the method and apparatus are capable of producing a plurality of variegated glass streams, and each stream differing in color formation.

It is not deemed necessary, or desirable, to illustrate specifically forming devices for marbles or other similar articles, and I have, therefore, merely illustrated in a general way molds 36. Obviously, the invention relates to the method and means for producing the variegated glass streams, and does not relate to any particular mechanism for forming the articles after the glass is produced; and I am free to use in connection with my method and apparatus any desired type of forming device.

From the foregoing description it is believed that my method and apparatus will be clearly understood. Molten glass flows from the flow spout in the well known manner, and I inject into this stream, preferably into the center thereof, another stream of molten glass differing from the first mentioned stream in color or composition. As the variegated glass flows from the spout it is formed into marbles, or other articles, by any desired forming devices. The method may undoubtedly be carried out by other apparatus, and, of course, it is not my intention to be limited to the particular apparatus described herein.

I will now describe a modified form of apparatus which is particularly adapted to combine a plurality of colored glass streams with the stream flowing from the melting tank; reference being had to Figure 5.

As in the previously described figures, numeral 1 indicates the melting tank; numeral 2, the flow spout; numeral 3, the flow hole; numeral 4, the bushing; numeral 4', the shears for severing the glass stream; numeral 36, the mold; and numeral 35, the burners.

A vertically adjustable gate 37, of refractory material, is arranged between the melting tank and the flow spout; the function thereof being to regulate the quantity of glass supplied to the flow spout.

Color pots 38, 38, of refractory material, are located above the flow spout, and each pot is provided with an outlet passage 39, permitting the colored glass to flow from the pots and unite with the stream of glass from the melting tank.

A vertically adjustable valve plug 40 is arranged in alignment with the outlet passage 39 of each pot, whereby the flow of the colored glass from the pots is controlled. A similar valve plug 41 is arranged in alignment with the flow hole 3 of the flow spout 2. It is not deemed necessary to illustrate means for operating the valve plugs, as any desirable means may be employed.

It is believed that the operation of the apparatus will be obvious from an inspection of the drawings. The molten glass flows in a stream from the melting tank to the flow spout; the quantity thereof being controlled by the adjustable gate 37. As this stream flows along the flow spout it receives the stream of colored glass from the first glass pot, and as these two streams combined continue along they receive from the second glass pot another stream of differently colored glass. The variegated glass stream thus produced flows through the flow hole and is sheared at predetermined intervals in the usual manner. The sheared portions are then pressed or otherwise formed into the desired patterns. The valve plug 41 controls the flow of molten glass in a manner well known in the art.

It will be apparent that I may employ any desired number of glass pots, each pot containing glass of a different color; that by the adjustment of the valve plugs I may control the quantity of each color supplied to the stream; and by entirely closing certain of the valves the combination of colors may be quickly changed. It is thus clear that by the use of the method and apparatus described herein I am able to produce variegated glass articles at a low cost, and of almost an infinite variety.

The streams of flowing glass are polygonal in cross-section, and by that term I intend to include streams that may be circular, oval, square or triangular in cross-section, or which have the shapes of any of the known flow orifices.

In accordance with the Patent Statutes, I have described what I now believe to be the best embodiments of my invention, but I do not wish to be understood thereby as limiting myself or the scope of my invention, as many modifications may be made without departing from the spirit of the invention; and all such I aim to include in the scope of the appended claims.

What I claim as new and desire to secure as Letters Patent is:

1. The method of producing variegated glass which includes combining molten glass of different colors in a flowing stream, said stream being polygonal in cross-section.

2. The method of producing variegated glass which consists in combining molten glass of different composition in a flowing stream, one of said glass compositions being substantially enveloped by the other.

3. The method of producing colored glass which comprises adding a coloring substance to a stream of flowing glass, and severing said stream into charges for molding.

4. The method of producing colored glass which consists of injecting a coloring substance into substantially the center of a flowing stream of glass.

5. The method of producing variegated glass which includes injecting a stream of molten glass into the interior of another stream of molten glass of different color.

6. The method of producing variegated glass which comprises injecting a stream of molten glass into substantially the center of another stream of molten glass of different color.

7. The method of producing variegated glass articles which consists in providing two streams of molten glass of different composition, combining the two streams, and supplying the glass thus combined to the forming devices, said streams being polygonal in cross-section.

8. The method of producing variegated glass articles which consists in providing two streams of molten glass of different hue, combining the two streams, and supplying the glass thus combined to forming devices, said streams being polygonal in cross-section.

9. The method of producing variegated glass which comprises providing two streams of molten glass of different hue, and injecting one of said streams into the interior of the other stream.

10. The method of producing variegated glass which includes providing two streams of glass of different hue, and injecting one of said streams into substantially the center of the other of said streams.

11. The method of producing variegated glass which consists in providing two streams of glass of different hue, and enveloping one of said streams within the other of said streams.

12. The method of producing glass which includes providing a plurality of streams of molten glass, and enveloping one of said streams within another of said streams.

13. The method of producing variegated glass articles which includes providing two streams of glass of different color, said streams being polygonal in cross-section, and feeding said streams of different color to forming devices.

14. The method of producing variegated glass articles which includes providing two streams of glass of different hue, said streams being columnar in shape, severing said streams into charges, and feeding said charges to forming devices.

IRA H. FREESE.